US008280900B2

(12) United States Patent
Pickens et al.

(10) Patent No.: US 8,280,900 B2
(45) Date of Patent: Oct. 2, 2012

(54) SPECULATIVE QUERY EXPANSION FOR RELEVANCE FEEDBACK

(75) Inventors: Jeremy Pickens, Milpitas, CA (US); Gene Golovchinsky, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 229 days.

(21) Appl. No.: 12/859,709

(22) Filed: Aug. 19, 2010

(65) Prior Publication Data

US 2012/0047159 A1 Feb. 23, 2012

(51) Int. Cl.
*G06F 17/30* (2006.01)
(52) U.S. Cl. ......................... 707/765; 707/766; 707/767
(58) Field of Classification Search ........................ None
See application file for complete search history.

(56) References Cited

U.S. PATENT DOCUMENTS

| | | | | |
|---|---|---|---|---|
| 6,587,848 | B1* | 7/2003 | Aggarwal et al. | 1/1 |
| 6,941,297 | B2* | 9/2005 | Carmel et al. | 707/765 |
| 7,236,923 | B1* | 6/2007 | Gupta | 704/9 |
| 8,065,316 | B1* | 11/2011 | Baker et al. | 707/768 |
| 8,145,660 | B2* | 3/2012 | Marvit et al. | 707/765 |
| 2002/0065863 | A1* | 5/2002 | Fruensgaard et al. | 709/100 |
| 2003/0212666 | A1* | 11/2003 | Basu et al. | 707/3 |
| 2006/0161520 | A1* | 7/2006 | Brewer et al. | 707/3 |
| 2006/0230035 | A1* | 10/2006 | Bailey et al. | 707/5 |
| 2007/0055652 | A1* | 3/2007 | Hood et al. | 707/3 |
| 2011/0307504 | A1* | 12/2011 | Agrawal et al. | 707/766 |

OTHER PUBLICATIONS

"Efficient and Self-tuning Incremental Query Expansion for Top-k Query Processing," by Theobald et al. IN: SIGIR '05 (2005). Available at: ACM.*
"Better than the Real Thing? Iterative Pseudo-Query Processing using Cluster-Based Language Models," by Kurland et al. IN: SIGIR '05 (2005). Available at: ACM.*
"An Iterative Implicit Feedback Approach to Personalized Search," by LV et al. IN: Proc. of the 21st Int'l Conf. on Computational Linguistics and 44th Annual Meeting of the ACL, pp. 585-592 (2006). Available at: ACM.*
"Measure-driven Keyword-Query Expansion," by Sarkas et al. IN: VLDB '09 (2009). Available at: ACM.*
S. Townsend et al., Predicting Query Performance, Aug. 11-15, 2002, ACM SIGIR' 02, Tampere, Finland.
C. Buckley, G. Salton, Optimization of Relevance Feedback Weights, 1995, pp. 351-357, SIGIR' 95, Seattle, USA.
Anytime algorithm, http://en.wikipedia.org/wiki/Anytime_algorithm (Retrieved 2010).
G. Cao et al., Selecting Good Expansion Terms for Pseudo-Relevance Feedback, Jul. 20-24, 2008, pp. 243-250, ACM SIGIR' 08, Singapore.
G. Salton, The Computation Laboratory, Mar. 1966, Cambridge, Massachusetts.
G. Salton, C. Buckley, Improving Retrieval Performance by Relevance Feedback, Journal of the American Society for Information Science, Jun. 1990, pp. 288-297, John Wiley & Sons, Inc., Ithaca, USA. Y. LV, C. Zhai, Adaptive Relevance Feedback in Information Retrieval Feedback in Information Retrieval, Nov. 2-6, 2009, pp. 255-264, ACM CIKM'09, Hong Kong, China.

* cited by examiner

*Primary Examiner* — Neveen Abel Jalil
*Assistant Examiner* — Daniel Kinsaul
(74) *Attorney, Agent, or Firm* — Sughrue Mion, PLLC

(57) ABSTRACT

Speculative query expansion is a way to increase the effectiveness of relevance feedback. Instead of picking the best expansion query beforehand, multiple queries are executed and the best expansion query is selected afterward, but with no additional effort (or information) required from the user. From the best expansion query, search results and expanded queries more pertinent to the user can therefore be provided.

7 Claims, 9 Drawing Sheets

SPECULATIVE QUERY EXPANSION FOR RELEVANCE FEEDBACK

BACKGROUND

1. Field of he Invention

This invention relates in general to systems, methods and computer readable mediums involving searching, and more specifically to conducting searches based on speculative queries.

2. Description of the Related Art

Relevance feedback in the form of query expansion (and reweighting terms selected for query expansion) is a well-known method for obtaining results that vastly improve upon an initial query. Traditional query expansion works by first identifying a set of relevant documents, selecting salient terms from these documents, adding these terms back into the initial query with an appropriate, information-theoretic weight, and then running this new query to produce a ranked list with (hopefully) higher precision than the original list.

A problem with traditional query expansion is that even when terms are weighted using effective information-theoretic measures, there remains a question of how many terms to actually add to the query, as this can have a large effect on the quality of the final outcome.

SUMMARY

Embodiments of the invention involve adding an element of speculation to query expansion processes. Query expansion terms are still selected and weighted using a standard information-theoretic metric. However, the question of how many terms are added is determined empirically, on the fly, by speculatively executing multiple queries and post-selecting that query with the highest pseudo-metric score.

Systems and methods described herein provide for a computer implemented method executed by a processor for returning search results based on speculative query expansion. The method may involve executing a speculative query expansion process. The speculative query expansion process may involve calculating a pseudo metric score of search results from a speculatively expanded query; and returning the search results with the highest pseudo metric score. Calculating the pseudo average precision score may involve filtering unjudged documents and calculating an average precision score from judged documents.

Systems and methods described herein provide for a computer implemented method executed by a processor for returning search results based on speculative query expansion. The method may involve receiving an initial query, retrieving a set of documents, where the set of documents includes documents judged either as relevant or non-relevant based on the initial query, and unjudged documents. A speculative query expansion process may be executed, which involves generating a list of query expansion terms based on the ranked documents, assigning a weight for each of the query expansion terms in the generated list, selecting at least one term from the list of query expansion terms, adding the selected at least one term to the initial query to create a speculatively expanded query, generating a list of documents from the set of documents based on the speculatively expanded query, and assigning a pseudo metric score for the speculatively expanded query based on the order of marked documents within the generated list. If no termination condition is met to terminate the speculative query process is received, then the process may re-iterate. Otherwise, the method may return the speculatively expanded query with the highest pseudo metric score.

Systems and methods may further provide for a non-transitory computer readable medium including instructions executed by a processor for returning search results based on speculative query expansion. The instructions may involve receiving an initial query, retrieving a set of documents, the set of documents including documents judged either as relevant or non-relevant based on the initial query, and unjudged documents. The instructions may further execute a speculative query expansion process, which may involve generating a list of query expansion terms based on the ranked documents, assigning a weight for each of the query expansion terms in the generated list, selecting at least one term from the list of query expansion terms, adding the selected at least one term to the initial query to create a speculatively expanded query, generating a list of documents from the set of documents based on the speculatively expanded query, and assigning a pseudo metric score for the speculatively expanded query based on the order of marked documents within the generated list. If no termination condition to terminate the speculative query process is received, the instructions may be reiterated. Otherwise, the instructions may return the speculatively expanded query with the highest pseudo average precision score.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. Specifically.

DETAILED DESCRIPTION

In the following detailed description, reference will be made to the accompanying drawings. The aforementioned accompanying drawings show by way of illustration, and not by way of limitation, specific embodiments and implementations consistent with principles of the present invention.

These implementations are described in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

Methods according to one embodiment of the invention, take advantage of recent advances in parallel and cloud-based computing by speculatively executing multiple queries, each with a different number of expansion terms. The quality of the results quality is measured post hoc using pseudo-AP (average precision) on previously-judged documents, a technique that requires no additional effort from the user, and the best list is selected for presentation to the user.

Application of Speculative Query Expansion

The basics of speculative query expansion involve a method for executing multiple query possibilities (speculating) and returning to the user the one that appears to be the best, given all the information that the system has currently collected from the user (typically in the form of prior relevance judgments).

Figure 1:
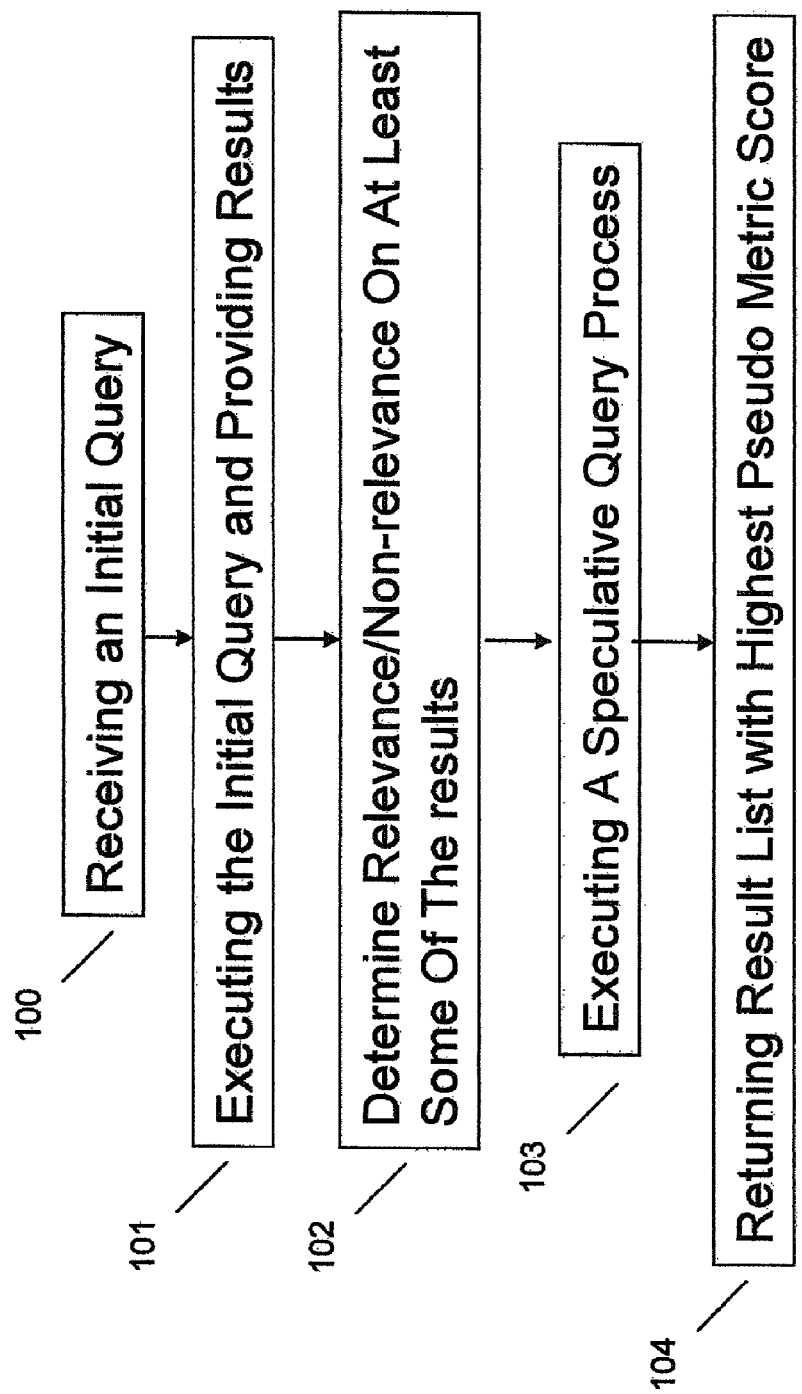
FIG. 1 illustrates an example flowchart of processing a speculative query according to an embodiment of the invention.

There are many different ways of accomplishing this process. One such approach, given by way of example and not limitation, operates as shown in FIG. 1:

Step 100: The user enters an initial query.

Step 101: The system executes that query and returns results.

Step 102: The user judges the top k documents, determining the (perhaps gradated) relevance and non-relevance of each of those k documents.

Step 103: The speculative query expansion process begins and produces one or more results lists.

Step 104: The results list with the highest pseudo metric score is selected and returned to the user. For example, the results list with the highest pseudo metric score can be displayed to the user on the user's computer screen.

Figure 2:
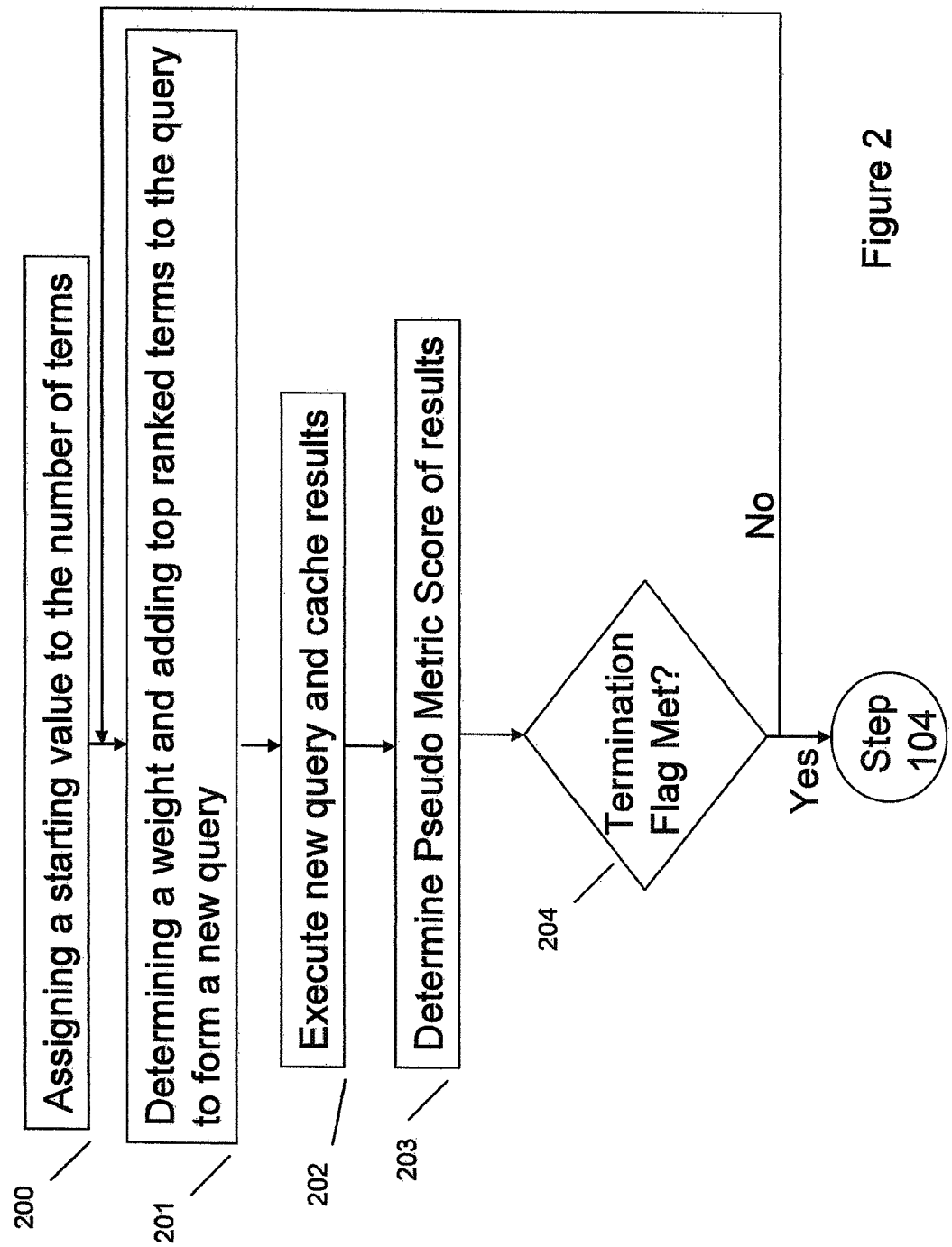
FIG. 2 illustrates an example flowchart of speculative query expansion, according to an embodiment of the invention.

The speculative query expansion process of step 103 from FIG. 1 can be further broken down into the following steps as illustrated in FIG. 2:

Step 200: The number of candidate expansion terms N (terms for expanding the query to create speculative queries) is selected; these terms are used to initialize the candidate expansion term pool. The candidate expansion terms are selected and weighted by methods known in the art (e.g., KL divergence, term frequency, etc.). The speculative query is initialized with the user's query terms (and weights, if any).

Step 201: The top M expansion terms with their weights are added to the speculative query, where M is less than N. The M expansion terms are removed from the candidate expansion term pool.

Step 202: The speculative query is executed using these terms and weights and the results of this query are cached.

Step 203: The quality of this speculative query is evaluated using a pseudo metric and is cached alongside the corresponding results list.

Step 204: An interruption flag is examined, and if this flag is set, the process continues to step 104. Otherwise, the process returns to step 201, where, more expansion terms are iteratively added to the speculative query.

Thus, the speculative query illustrated in FIGS. 1 and 2 involves three specific components, namely, how query expansion terms are selected (Step 201), how results lists are evaluated (Step 203), and how the system is interrupted, so as to return a result to the user (Step 204).

Selecting Query Expansion Terms

Query expansion terms are selected iteratively, by adding the top M terms to the query from the previous iteration, where "top" is determined by any applicable method known in the art (KL divergence, Rocchio, Support Vector Machines, etc.) based on terms in documents that have been explicitly judged to be relevant and terms in the remainder of the collection. However, this speculative expansion does not necessary have to occur in this manner. For example, at any speculative step, the top M and bottom M terms can be added. Or the middle M terms can be added instead. The expanded speculative query is then processed and evaluated.

Evaluating Results List—Example with Pseudo Average Precision

The results from the speculative expanded query will be a set of documents where some of the documents are known to be either relevant or non-relevant and where the relevancy for the remaining documents is unknown. A pseudo metric score can be calculated based on the order of the judged documents that have been presented back as results, either during the current iteration or at some point in the session as a whole. The pseudo metric score is calculated by utilizing a known metric and applying it in a pseudo manner (only on judged documents), thereby rendering it a pseudo metric. In this example, the average precision metric is utilized in a pseudo manner. Other metrics, such as NDCG, Precision@10, and others known in the art, may also be similarly used in a pseudo manner based on the order of the judged relevant and non-relevant documents.

Figure 3:
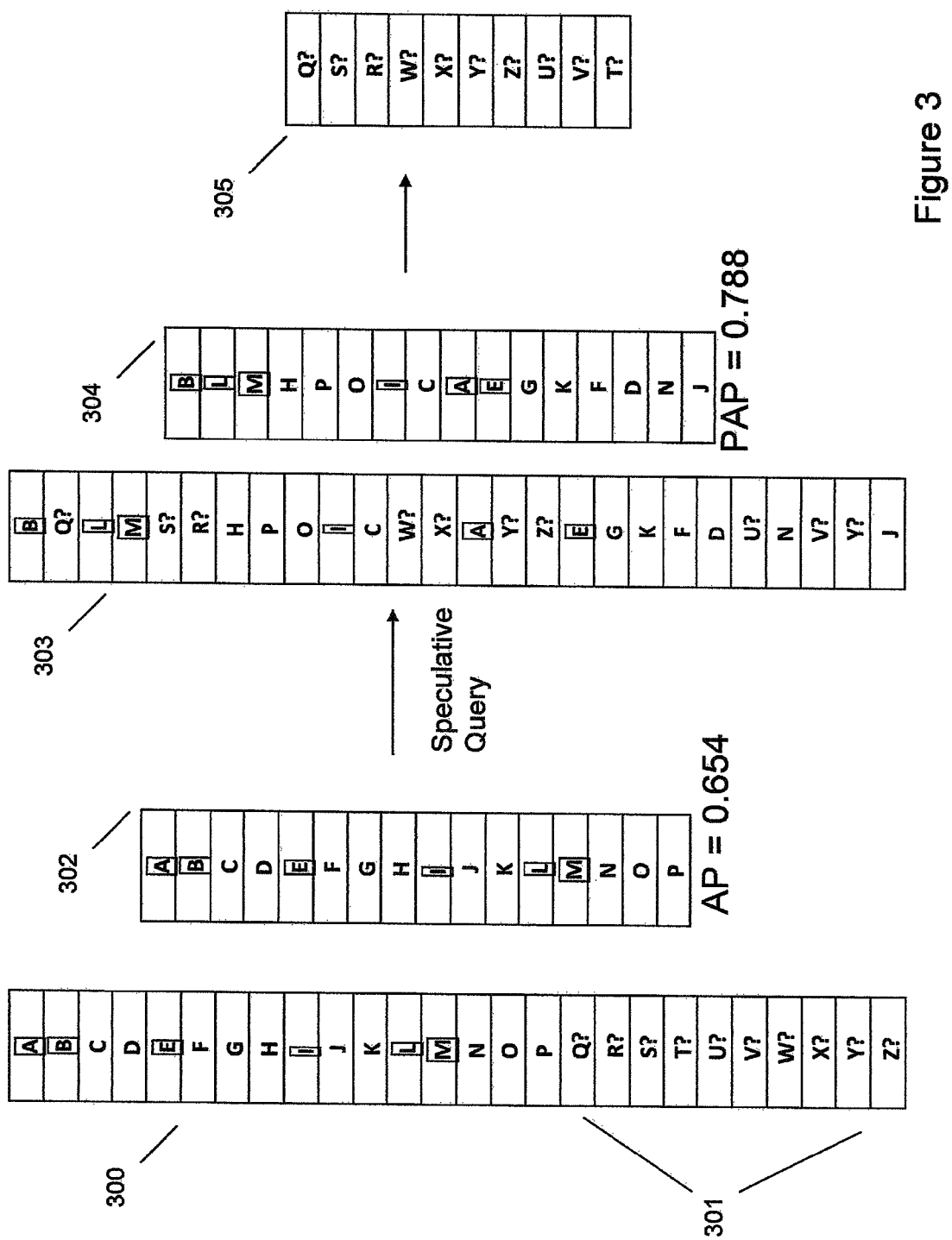
FIG. 3 illustrates an example iteration according to an embodiment of the invention.
Figure 4:
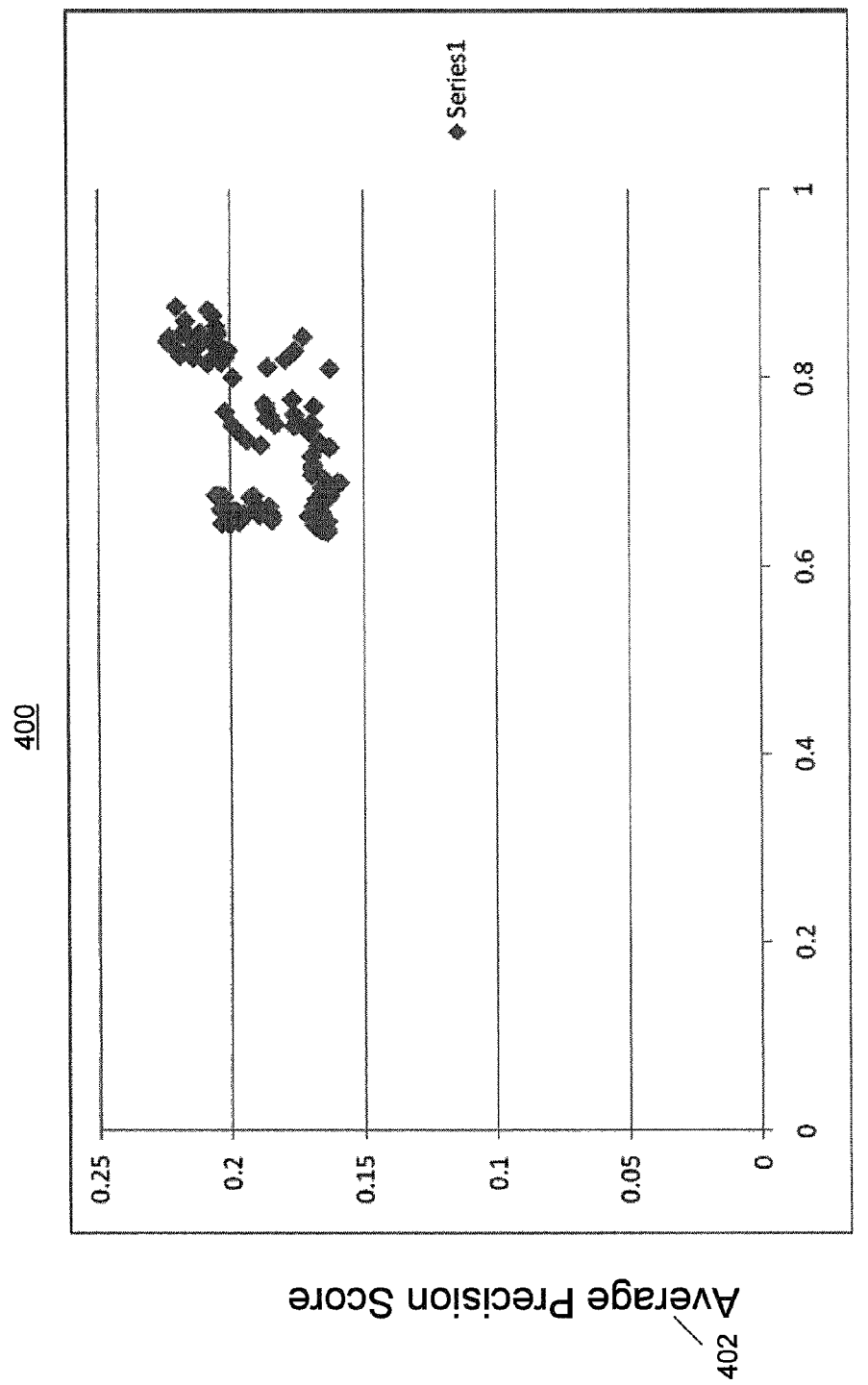
FIGS. 4 through 8 illustrate example evaluations of sets of results produced according to an embodiment of the invention.
Figure 5:
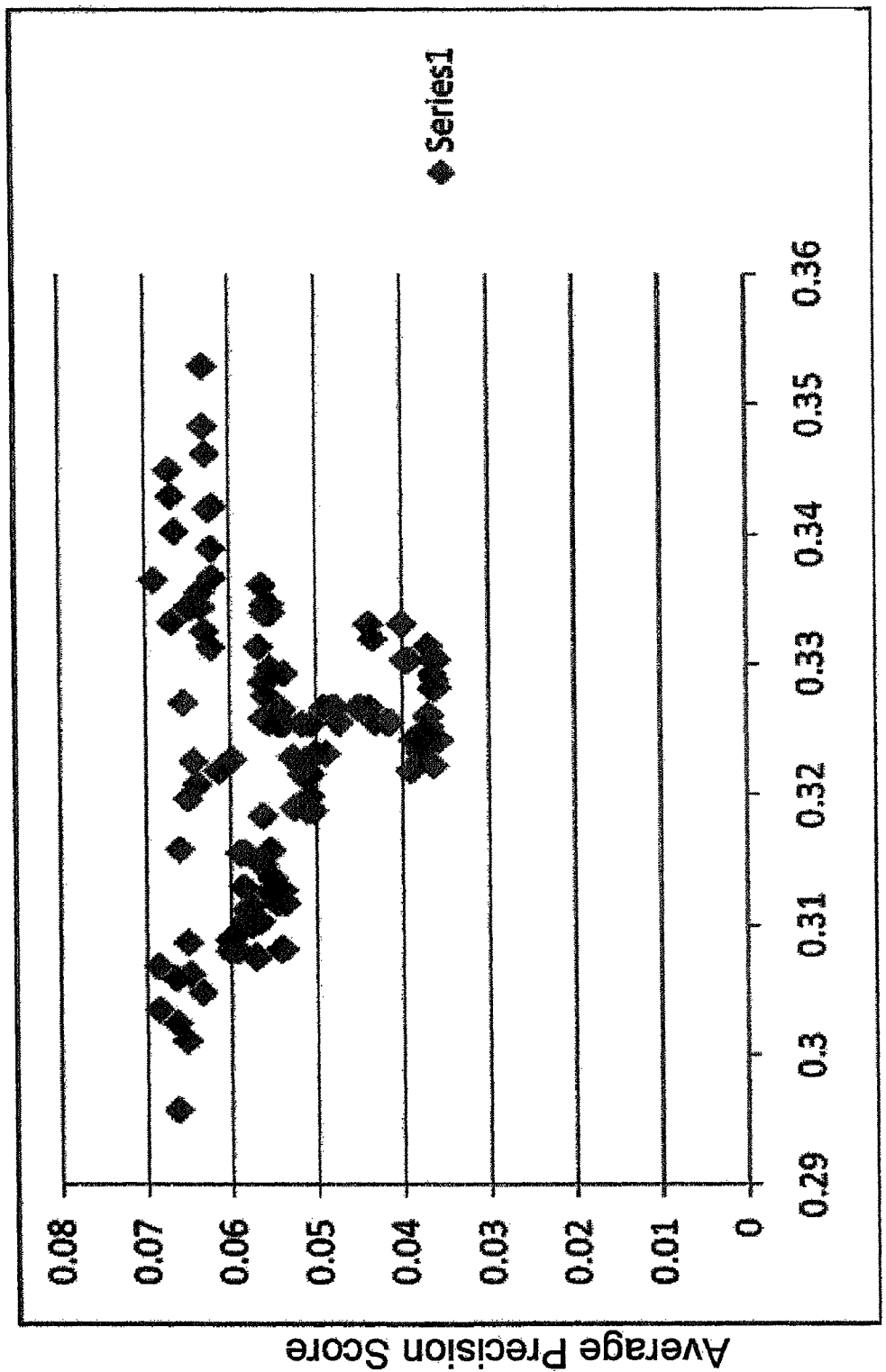
Figure 6:
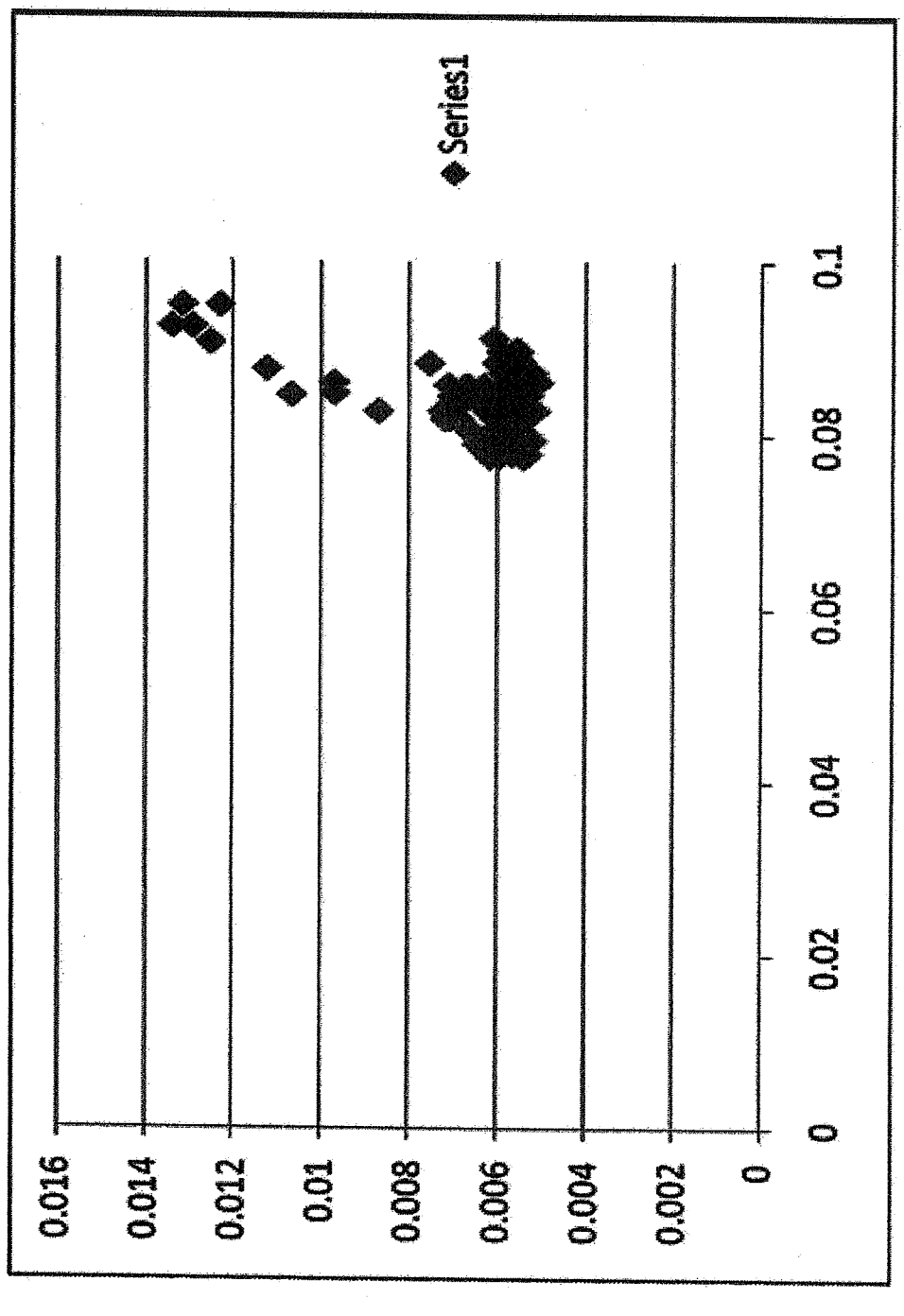
Figure 7:
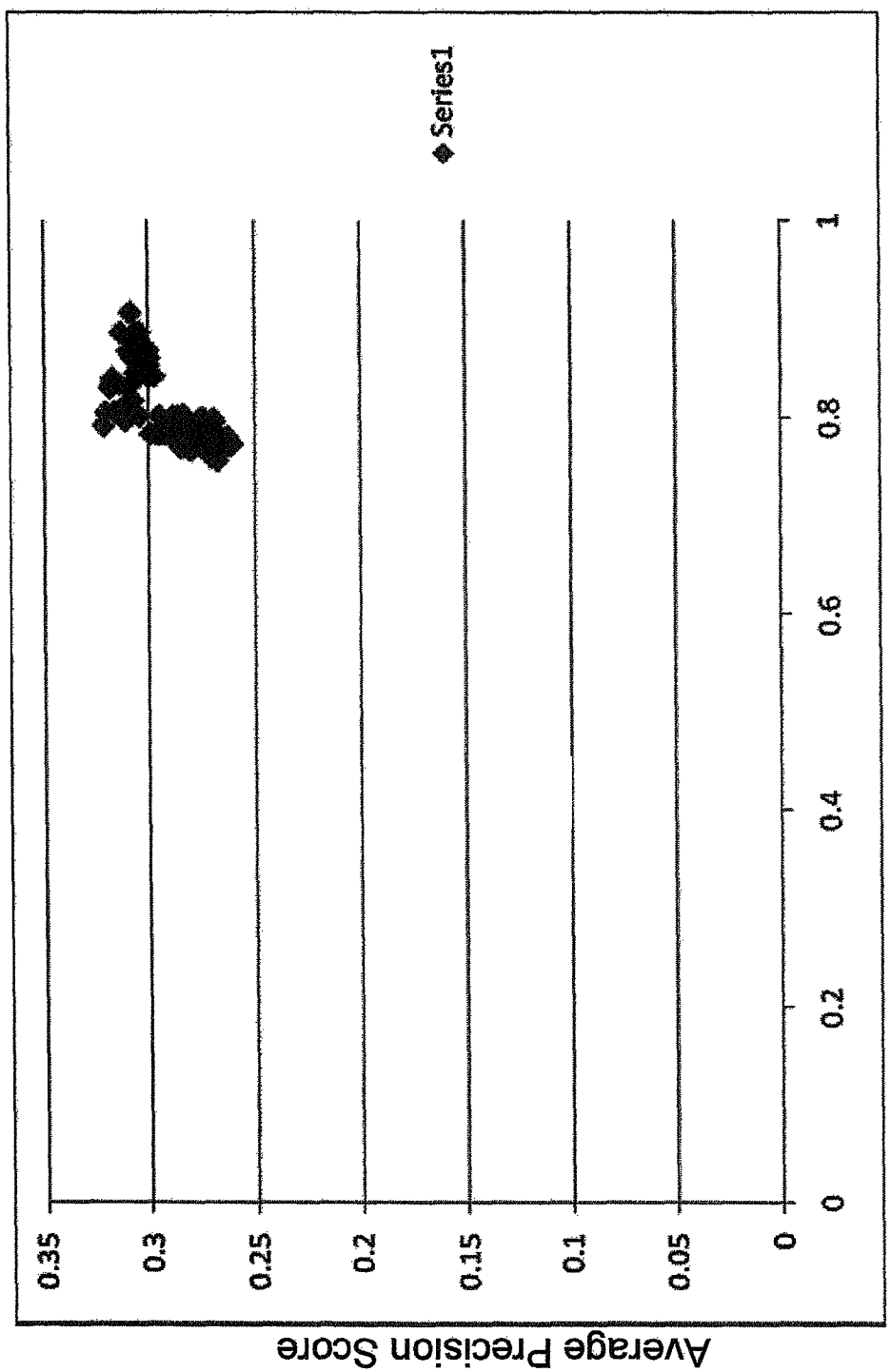
Figure 8:
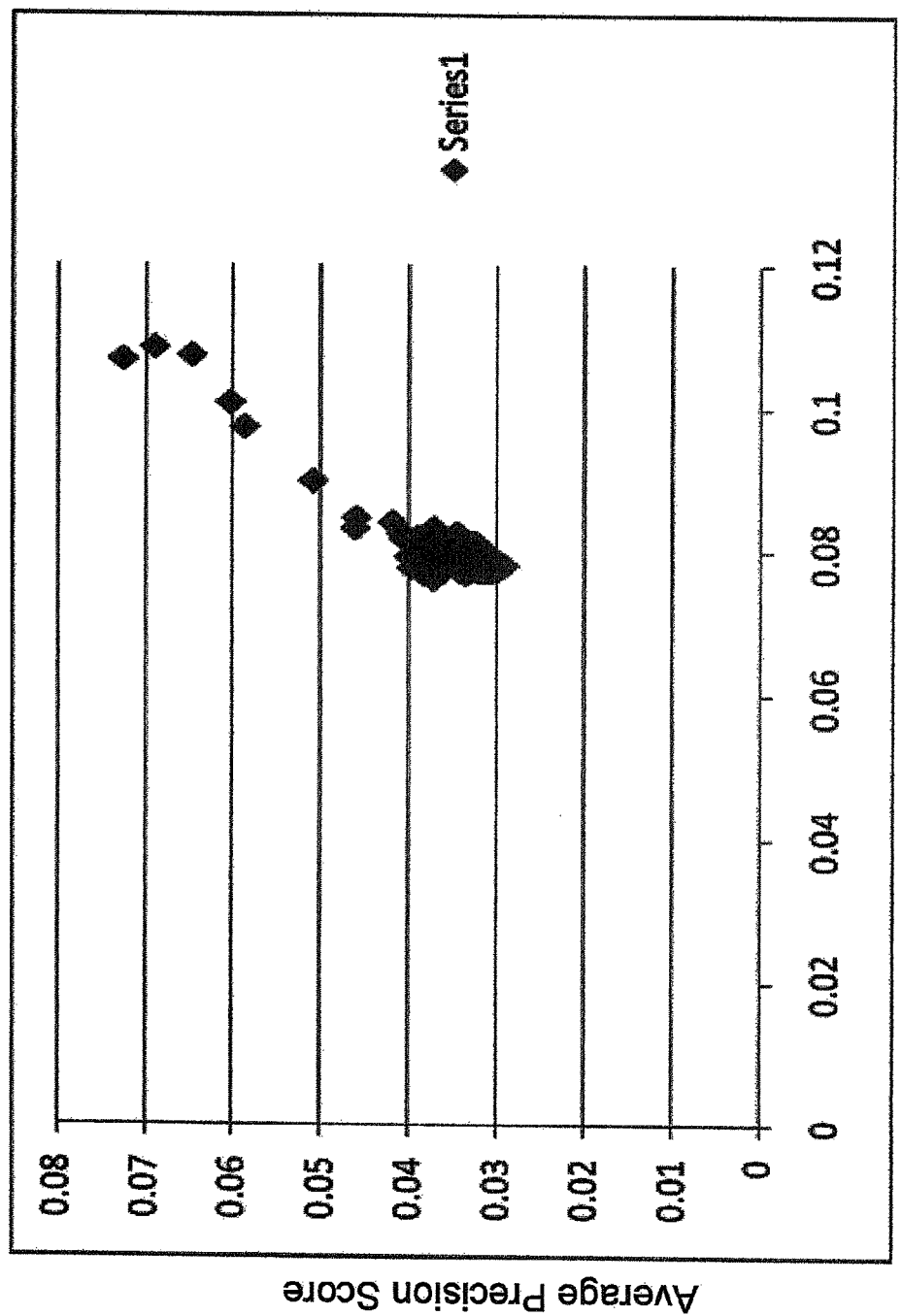

FIG. 3 provides an example of how pseudo average precision (an example of a pseudo metric) can be applied to a set of documents when some of the documents are known to be either relevant or non-relevant, according to an embodiment of the invention. From the initial query, a set of documents 300 is retrieved, wherein documents may be marked as relevant (documents labeled as relevant are marked with a square marker for illustration purposes) or non-relevant (in this example, no marker), with the status of as yet unjudged documents 301 is shown with a question mark. The documents can be marked as relevant or non-relevant by, for example, the user, or by the system through analysis of previous browsing history, or other means for scoring relevancy.

From the initial set of documents, the average precision score is obtained by calculating the total number of documents from the first judged document of the set to the last judged document 302. To calculate the score, we first determine the sum of the ratios of the number of (retrieved AND relevant) documents to the number of (retrieved AND judged) documents at every point in the ranked list that a new relevant document is discovered. This sum is then normalized by the total number of available relevant documents, yielding the average precision score (AP). In this example, it takes thirteen documents to retrieve all six relevant documents. In traversing the list, we find that the AP is $((1/1)+(2/2)+(3/5)+(4/9)+(5/12)+(6/13))/6$, thereby making the score roughly 0.654.

Pseudo Average Precision

For subsequent lists generated by speculatively expanded queries, the pseudo average precision is calculated. By ignoring any document that has not yet been examined by the user (i.e. judged, or marked as relevant or non-relevant), the system can look at the relative positions in this new list of all the documents (relevant and non-relevant) that have already been judged. Pseudo average precision is the average precision calculated over only this subset, ignoring additional retrieved documents that were not previously judged, but paying close attention to the new relative order of the previously judged documents. The intuition is that a new query that places more of the known relevant documents ahead of the known non-relevant documents will also place more of the unknown (as-yet-unseen) relevant documents ahead of the unknown non-relevant documents.

FIG. 3 shows an example of pseudo average precision being applied to documents where the relevance of some of the top ranked documents is unknown (either not having been indicated by the user as relevant or non-relevant) according to an embodiment of the invention. Upon submitting the speculatively expanded query, the results may involve a list with the unknown documents (e.g. Q, S, R) interspersed with the documents where the relevance is known (e.g. B, L, M) 303. However, for calculating pseudo average precision, the unknown documents are simply ignored or filtered out 304 and the score is calculated as if the real average precision is being calculated to provide the pseudo average precision score.

Once the pseudo average precision score is calculated, embodiments of the invention can further cache the results and submit more speculative queries. Eventually, the results list with the highest pseudo average precision score is returned. In the given example, the pseudo average precision score of the speculative query submission (roughly 0.788) is higher than the real average precision score of the initial query. The order of the unknown documents of the second list 305 will tend to place more relevant documents ahead of non-relevant documents when compared to the order within the initial list 301.

The basic mechanics of embodiments of the invention therefore provide for executing multiple query possibilities (speculating) and returning to the user the query and results that appear to be the best, given all the information the system may have collected from the user (in the form of prior relevance judgments or other means).

Interrupting the System

Speculative execution of queries may stop after a predetermined number of steps, or it may be interrupted due to other considerations, such as processor availability or total elapsed time (the latter to avoid long delays in user experience). In that sense, speculative query expansion can be interrupted at any necessary time.

Evaluating Results

FIGS. 4 through 8 illustrate example evaluations of sets of results produced according to an embodiment of the invention. For FIG. 4, the graph 400 compares the calculated pseudo average precision 401 along the x-axis versus the real average precision 402 along the y-axis. Each data point corresponds to one iteration of the speculative query expansion (Step 103). In this example, from the initial non-expanded results set, the top thirty judgments were judged by the user based on relevance.

The graph shows that generally there is a positive correlation between pseudo average precision and real average precision. Therefore, in the speculative execution scenario, if the results list with the highest pseudo-AP (the data point on each graph that is furthest to the right along the x-axis) is selected to return to the user, that list will indeed be among the best, if not the best, possible list from a relevance standpoint. For example, the result list with the largest pseudo AP score, approximately 0.9, has a real AP score of about 0.22, which is among the highest of the real AP scores. As seen in the graph in FIG. 4, since the result list with a high pseudo AP score also has a high real AP score, a high pseudo AP score is a good predictor of a high real AP score. FIGS. 5 through 8 similarly demonstrate a correlation between the pseudo AP and real AP scores.

Figure 9:
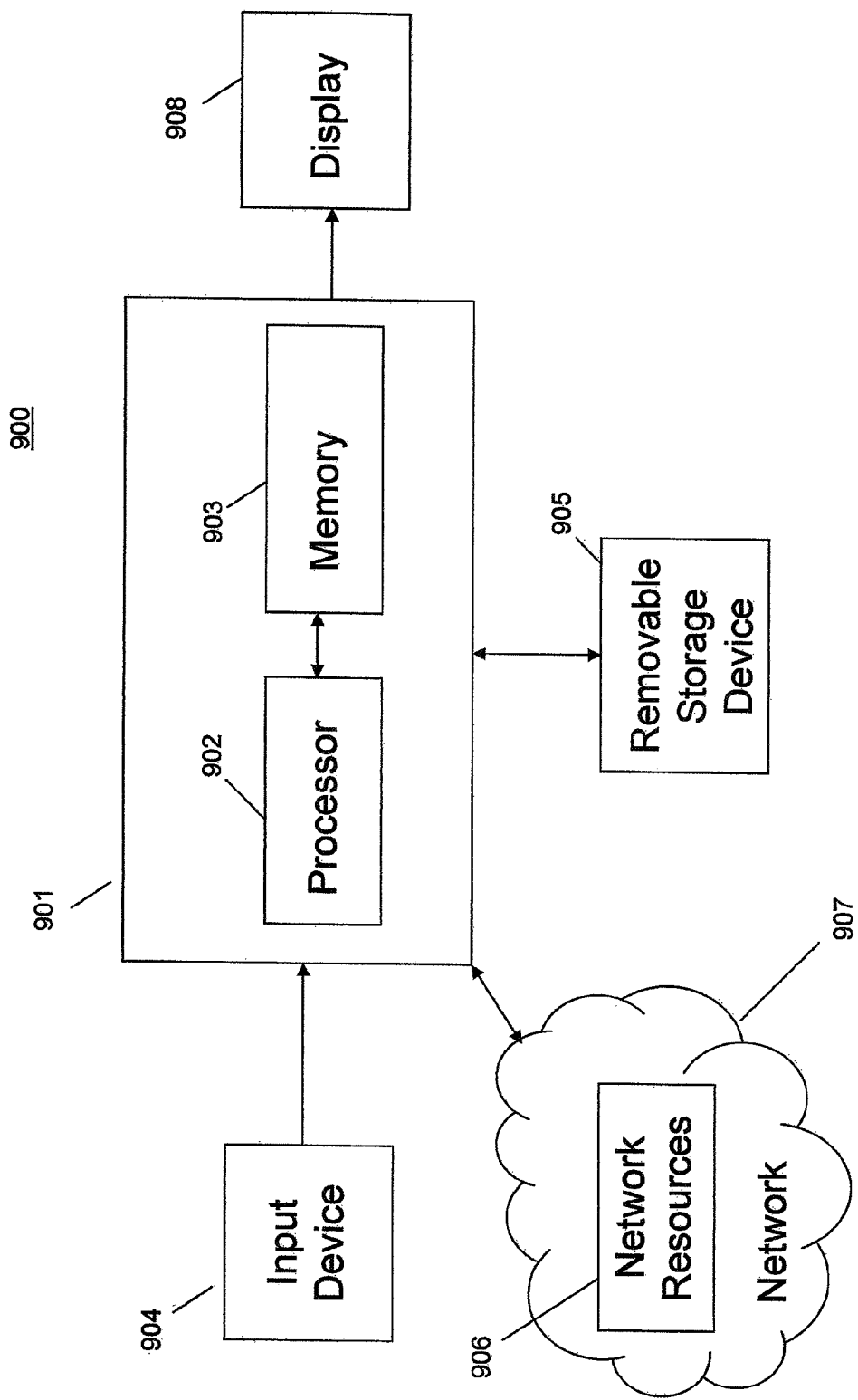
FIG. 9 illustrates a block diagram of a computer system upon which the system may be implemented.

FIG. 9 is a block diagram that illustrates an embodiment of a computer/server system 900 upon which an embodiment of the inventive methodology may be implemented. The system 900 includes a computer/server platform 901 including a processor 902 and memory 903 which operate to execute instructions, as known to one of skill in the art. The term "computer-readable medium" as used herein refers to any medium that participates in providing instructions to processor 902 for execution. Additionally, the computer platform 901 receives input from a plurality of input devices 904, such as a keyboard, mouse, touch device or verbal command. The computer platform 901 may additionally be connected to a removable storage device 905, such as a portable hard drive, optical media (CD or DVD), disk media or any other medium from which a computer can read executable code. The computer platform may further be connected to network resources 906 which connect to the Internet or other components of a local public or private network. The network resources 906 may provide instructions and data to the computer platform from a remote location on a network 907. The connections to the network resources 906 may be via wireless protocols, such as the 802.11 standards, Bluetooth® or cellular protocols, or via physical transmission media, such as cables or fiber optics. The network resources may include storage devices for storing data and executable instructions at a location separate from the computer platform 901. The computer interacts with a display 908 to output data and other information to a user, as well as to request additional instructions and input from the user. The display 908 may therefore further act as an input device 904 for interacting with a user.

Moreover, other implementations of the invention will be apparent to those skilled in the art from consideration of the specification and practice of the invention disclosed herein. Various aspects and/or components of the described embodiments may be used singly or in any combination in the embedded media barcode system. It is intended that the specification and examples be considered as exemplary only, with a true scope and spirit of the invention being indicated by the following claims.

What is claimed is:

1. A computer implemented method executed by a processor for returning search results based on speculative query expansion, comprising:
   receiving an initial query;
   retrieving a set of documents based on the initial query, the set of documents comprising documents judged either as relevant or non-relevant to the initial query, and unjudged documents;
   executing a speculative query expansion process based on the retrieved set of documents, comprising:
   a. generating a list of query expansion terms based on the judged documents;
   b. assigning a weight for each of the query expansion terms in the generated list;
   c. selecting at least one term from the list of query expansion terms;
   d. adding the selected at least one term to the initial query to create a speculatively expanded query wherein the speculatively expanded query is indicative of a query possibility;
   e. generating a list of documents from the set of documents based on the speculatively expanded query;
   f. assigning a pseudo metric score for the speculatively expanded query based on the order of judged documents within the generated list wherein the pseudo metric score is indicative of an application of a metric on the judged documents;
g. if no termination condition is met to terminate the speculative query process is received, returning to step c; and
h. returning the speculatively expanded query with the highest pseudo metric score;

returning search results based on the speculative query expansion process.

2. The computer implemented method of claim 1, wherein the instruction to terminate the speculative query process is based on a preset number of iterations.

3. The computer implemented method of claim 1, wherein the judged documents are removed from the generated list.

4. The computer implemented method of claim 1, wherein the returning the speculatively expanded query further comprises returning the generated list.

5. A non-transitory computer readable medium comprising instructions executed by a processor for returning search results based on speculative query expansion, the instructions comprising:

receiving an initial query;
retrieving a set of documents based on the initial query, the set of documents comprising documents judged either as relevant or non-relevant to the initial query, and unjudged documents;
executing a speculative query expansion process based on the retrieved set of documents, comprising:
  a. generating a list of query expansion terms based on the judged documents;
  b. assigning a weight for each of the query expansion terms in the generated list;
  c. selecting at least one term from the list of query expansion terms;
  d. adding the selected at least one term to the initial query to create a speculatively expanded query, wherein the speculatively expanded query is indicative of a query possibility;
  e. generating a list of documents from the set of documents based on the speculatively expanded query;
  f. assigning a pseudo metric score for the speculatively expanded query based on the order of marked documents within the generated list, wherein the pseudo metric score is indicative of an application of a metric on the judged documents;
  g. if no termination condition is met to terminate the speculative query process is received, returning to step c; and
  h. returning the speculatively expanded query with the highest metric score;

returning search results based on the speculative query expansion process.

6. The non-transitory computer readable medium of claim 5, wherein the instruction to terminate the speculative query process is based on a preset number of iterations.

7. The non-transitory computer readable medium of claim 5, wherein the retrieving of documents further comprises conducting a search for the set of documents based on the initial query.

* * * * *